United States Patent

Ishikawa et al.

[11] Patent Number: 5,983,289
[45] Date of Patent: Nov. 9, 1999

[54] DATA TRANSFER METHODS AND CONTROLLER FOR TRANSFERRING DATA IN BLOCKS WITHOUT CROSSING CERTAIN ADDRESS BOUNDARIES

[75] Inventors: Osamu Ishikawa; Toshikazu Ito; Satoshi Yamamoto; Yoshikazu Endo, all of Tokyo, Japan

[73] Assignee: Oki Data Corporation, Tokyo, Japan

[21] Appl. No.: 08/923,130

[22] Filed: Sep. 4, 1997

[30] Foreign Application Priority Data

Sep. 11, 1996 [JP] Japan .................................. 8-262397

[51] Int. Cl.⁶ .............................. G06F 13/14; G06F 13/20
[52] U.S. Cl. .................................. 710/35; 710/4; 710/22; 710/33
[58] Field of Search ............................ 395/824, 842, 395/853, 855; 710/1, 4, 22, 33, 35

[56] References Cited

U.S. PATENT DOCUMENTS

| | | | |
|---|---|---|---|
| 5,477,525 | 12/1995 | Okabe | 369/275.3 |
| 5,555,380 | 9/1996 | Suzuki | 395/250 |
| 5,675,790 | 10/1997 | Walls | 395/621 |
| 5,687,392 | 11/1997 | Radko | 395/842 |
| 5,706,281 | 1/1998 | Hashimoto et al. | 370/252 |
| 5,751,970 | 5/1998 | Bournas | 395/200.66 |
| 5,809,254 | 9/1998 | Matsuzono | 395/200.65 |

*Primary Examiner*—Thomas C. Lee
*Assistant Examiner*—Rehana Perveen
*Attorney, Agent, or Firm*—Akin, Gump, Strauss, Hauer & Feld, L.L.P.

[57] ABSTRACT

A data transfer controller transfers data in blocks having a restricted set of permitted sizes. Before transferring each block, the data transfer controller performs a segmented comparison on the current data address, at which the block starts, and a stopping address, at which the entire data transfer will end, and determines the block size from the result of the segmented comparison. In the segmented comparison, the data transfer controller compares a first part of the data address with a first part of the stopping address, then compares a second part of the data address with a second part of the stopping address. The comparison of second parts is made in different ways, depending on the result of the comparison of first parts.

21 Claims, 6 Drawing Sheets

FIG. 3

| No. | INPUT | | | OUTPUT | |
|---|---|---|---|---|---|
| | EQ | ADR(1~0) | STP(1~0) | BS | END |
| 1 | 1 | 0 0 | 0 0 | 0 0 | 1 |
| 2 | 1 | 0 0 | 0 1 | 0 1 | 1 |
| 3 | 1 | 0 0 | 1 0 | 0 1 | 0 |
| 4 | 1 | 0 0 | 1 1 | 1 0 | 1 |
| 5 | 1 | 0 1 | 0 0 | — | — |
| 6 | 1 | 0 1 | 0 1 | 0 0 | 1 |
| 7 | 1 | 0 1 | 1 0 | 0 1 | 1 |
| 8 | 1 | 0 1 | 1 1 | 0 1 | 0 |
| 9 | 1 | 1 0 | 0 0 | — | — |
| 10 | 1 | 1 0 | 0 1 | — | — |
| 11 | 1 | 1 0 | 1 0 | 0 0 | 1 |
| 12 | 1 | 1 0 | 1 1 | 0 1 | 1 |
| 13 | 1 | 1 1 | 0 0 | — | — |
| 14 | 1 | 1 1 | 0 1 | — | — |
| 15 | 1 | 1 1 | 1 0 | — | — |
| 16 | 1 | 1 1 | 1 1 | 0 0 | 1 |
| 17 | 0 | 0 0 | * * | 1 0 | 0 |
| 18 | 0 | 0 1 | * * | 0 1 | 0 |
| 19 | 0 | 1 0 | * * | 0 1 | 0 |
| 20 | 0 | 1 1 | * * | 0 0 | 0 |

\* ⎫ DON'T
— ⎭ CARE

BS ⎧ 00 : 1 WORD
   ⎨ 01 : 2 WORDS
   ⎩ 10 : 4 WORDS

DATA TRANSFER METHODS AND CONTROLLER FOR TRANSFERRING DATA IN BLOCKS WITHOUT CROSSING CERTAIN ADDRESS BOUNDARIES

BACKGROUND OF THE INVENTION

The present invention relates to a method and controller for transferring data by direct memory access, more particularly to a method and controller employing a restricted block transfer mode.

Direct memory access has long been used to transfer data at high speed over data buses in computing and communication equipment, bypassing the equipment's central processing unit (CPU). In the restricted block transfer mode, the data can be transferred in blocks, but the block size is restricted to certain values. After the transfer of each block, direct memory access pauses to allow memory access by the CPU or another device. The restricted block transfer mode is useful when, for example, the memory structure permits rapid access to blocks of data that do not cross certain forbidden address boundaries.

One way to avoid crossing such address boundaries is to restrict the starting and stopping addresses of data transfers to certain address values. Such restrictions are undesirable, however, because they often force unnecessary data to be transferred.

If the starting and stopping addresses are not restricted, then to avoid crossing forbidden address boundaries, a data transfer may have to be divided into a plurality of sections, and a different block size employed in each section. Conventional direct memory access controllers are not adapted to do this, however; normally, the block size must be set and changed by the CPU. CPU interrupts must accordingly be generated during the course of the transfer, which slows the transfer and causes undesirable CPU overhead.

SUMMARY OF THE INVENTION

It is accordingly an object of the present invention to enable a direct memory access controller to select appropriate block sizes autonomously.

According to the invented data transfer method, data are transferred in blocks having a restricted set of permitted sizes. A data transfer comprises the transfer of one or more consecutive blocks of these sizes. Before each block is transferred, a data address indicating the starting address of the block is known, and the stopping address of the entire data transfer is known, but the block size is undetermined. A segmented comparison is made between the above-mentioned data address and stopping address. The segmented comparison comprises a first comparison between a first part of the data address and the corresponding part of the stopping address, and a second comparison between a second part of the data address and the corresponding part of the stopping address, the second comparison being performed in different ways according to the result of the first comparison. A block size is selected according to the result of the second comparison; then the block is transferred, using the selected block size. This process is repeated until the entire data transfer is completed.

The invented data transfer controller has an address counter that holds the data address, an address register that holds the stopping address, a control unit, and a segmented comparator for performing the first comparison and second comparison.

BRIEF DESCRIPTION OF THE DRAWINGS

In the attached drawings:

FIG. 3 indicates the logic by which the BS and END signals in FIG. 1 are generated;

DETAILED DESCRIPTION OF THE INVENTION

A direct memory access controller exemplifying the present invention will be described below with reference to the attached drawings, and a data transfer illustrating the operation of this data transfer controller will be explained.

Figure 1:
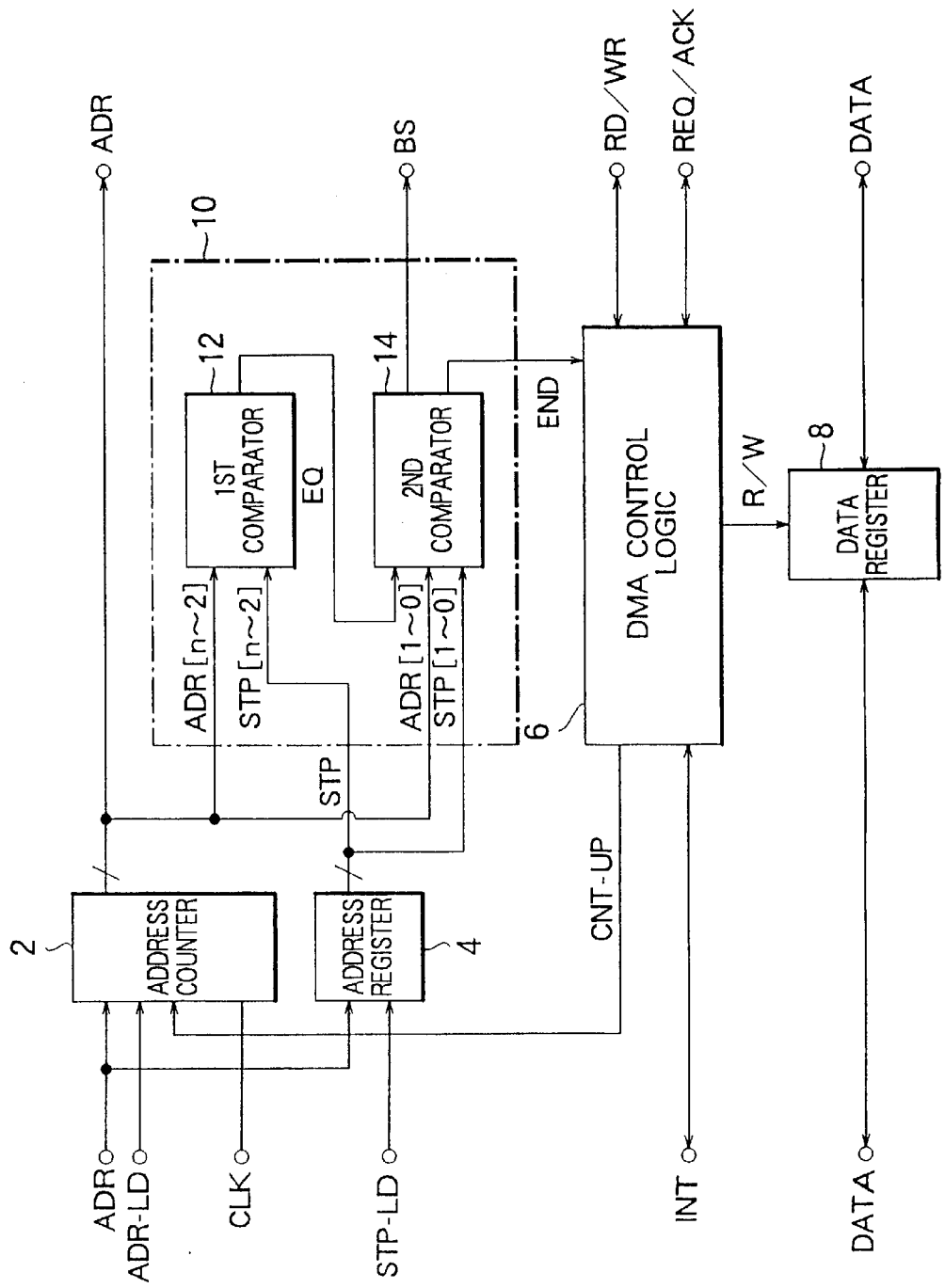
FIG. 1 is a block diagram of a direct memory access controller exemplifying the present invention.

FIG. 1 shows the internal structure of the direct memory access controller, which comprises an address counter 2, an address register 4, direct memory access (DMA) control logic 6, a data register 8, and a novel segmented comparator 10. The segmented comparator 10 comprises a first comparator 12 and a second comparator 14.

The address counter 2 receives an input address signal (ADR), a starting-address-load signal (ADR-LD), a clock signal (CLK), and a count-up signal (CNT-UP). The value of the input address signal is loaded into the address counter 2 in response to the ADR-LD signal, incremented in response to the CLK and CNT-UP signals, and supplied from the address counter 2 as a data address signal, also denoted ADR.

The address register 4 receives the input address signal (ADR) and a stopping-address-load signal (STP-LD). The value of the input address signal is loaded into the address register 4 in response to the STP-LD signal, and supplied as a stopping address signal, denoted STP.

The above address signals signal are n-bit signals, where n is an integer greater than two.

The segmented comparator 10 receives the data address signal and stopping address signal. The first comparator 12 compares the n−2 most significant bits of these signals, and generates an equality signal (EQ) indicating whether the compared bits are mutually identical. The second comparator 14 compares the two least significant bits of the data address signal and stopping address signal on the basis of the EQ signal, and thereby generates a two-bit block size signal (BS) and a one-bit end signal (END).

The DMA control logic 6 receives the end signal and generates the count-up signal. The DMA control logic 6 also sends and receives interrupt signals (INT), read/write signals (RD/WR and R/W), and request/acknowledge signals (REQ/ACK).

The data register 8 functions as a data buffer controlled by the R/W signal.

Figure 2:
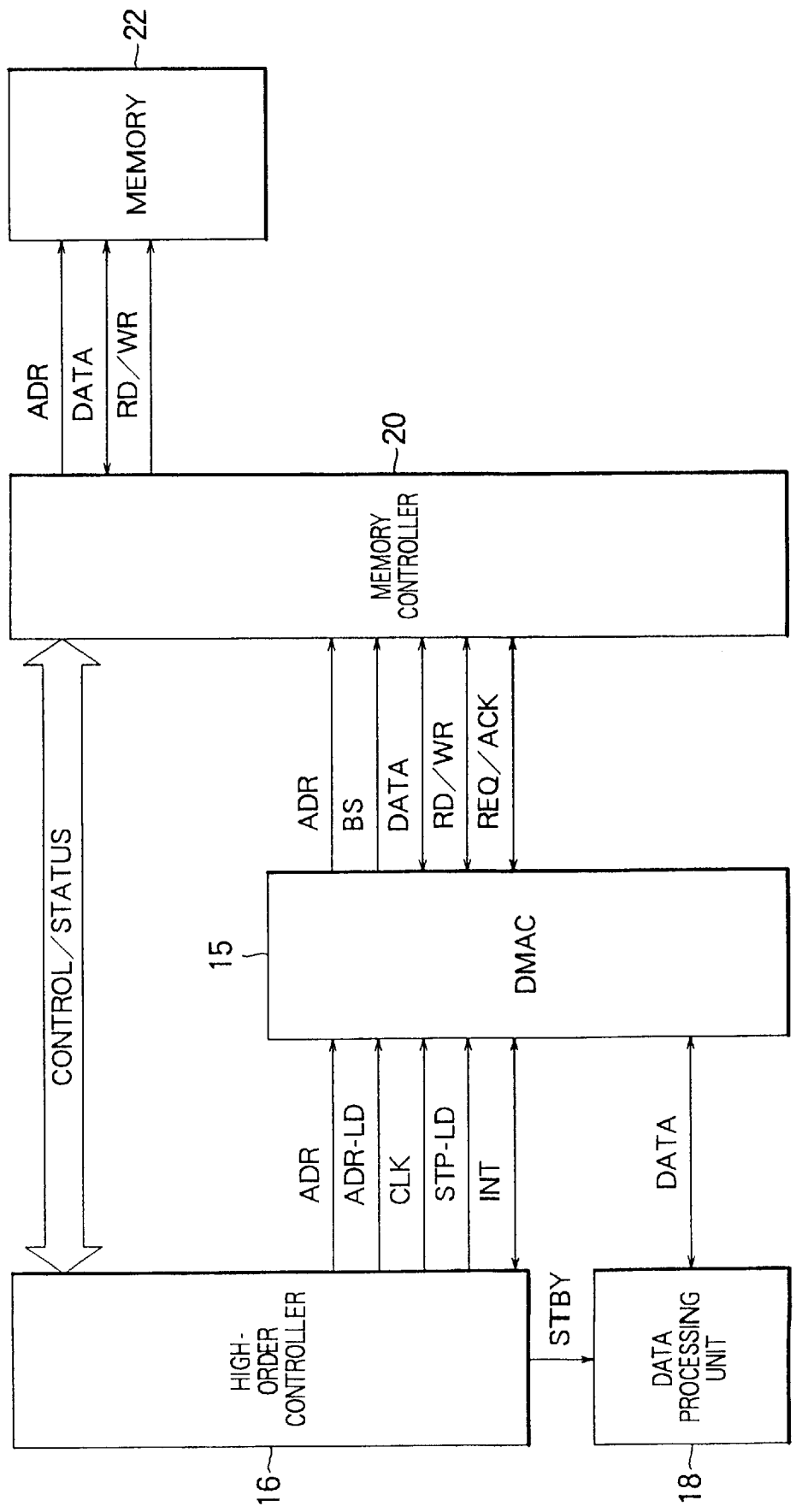
FIG. 2 illustrates interconnections between this direct memory access controller and other devices.

FIG. 2 shows the signal interfaces between the above direct memory access controller (DMAC) 15 and a high-order controller 16, data processing unit 18, and memory controller 20, and the signal interfaces between the memory controller 20 and a memory 22. The direct memory access controller 15 receives the input address, starting-address-load, clock, and stopping-address-load signals from the high-order controller 16, and sends the data address and block size signals to the memory controller 20. The direct memory access controller 15 also exchanges interrupt signals with the high-order controller 16, exchanges data with the data processing unit 18, and exchanges data, read-write (RD/WR), and request/acknowledge signals with the memory controller 20.

In addition, the high-order controller 16 exchanges control and status signals with the memory controller 20, and sends a standby (STBY) signal to the data processing unit 18. The memory controller 20 sends address (ADR) and read/write (RD/WR) signals to the memory 22, and exchanges data with the memory 22.

In communication equipment, the high-order controller 16 is, for example, a microprocessor or other central processing unit controlling the overall operation of the equipment, and the data processing unit 18 is a coder-decoder, filter, or other specialized processing unit.

FIG. 3 illustrates the operation of the second comparator 14 in the direct memory access controller 15 in the form of an input-output table. The numbers from one to twenty, identifying rows on the left side of this table, are non-functional, but will be referred to in the description below. The permitted block sizes are one, two, and four words, indicated by BS signal values of '00,' '01,' and '10,' respectively. A word is the minimum unit in which data can be transferred.

The equality signal (EQ) is generated as, for example, a zero flag in a subtraction operation performed by the first comparator 12. The equality (EQ) value is accordingly '1' when the first n–2 bits of the data address signal are identical to the first n–2 bits of the stopping address signal, and '0' when they are not identical.

When the equality value (EQ) is '1,' the second comparator 14 subtracts the last two bits of the data address signal from the last two bits of the stopping address signal. The block size value is set to one word, represented by '00' in the BS signal, if the difference is zero; to two words, represented by '01,' if the difference is one or two; and to four words, represented by '10,' if the difference is three. The end signal is set to '0' if the difference is two, and to '1' in other cases, the '1' value indicating that the data transfer will end with the current block. These results are shown in rows one to sixteen of the table.

The horizontal dashes correspond to cases in which the stopping address is less than the data address. These cases do not actually occur, so the block size signal can have any value; that is, the block size in these non-occurring cases is a "don't-care" value.

When the equality value (EQ) is '0,' the second comparator 14 ignores the last two bits of the stopping address, subtracts the data address from '11,' sets the block size (BS) according to the rule given above, and sets the end signal to '0.' These results are shown in rows seventeen to twenty of the table, using asterisks to indicate that the last two bits of the stopping address are "don't-care" bits.

Figure 4:
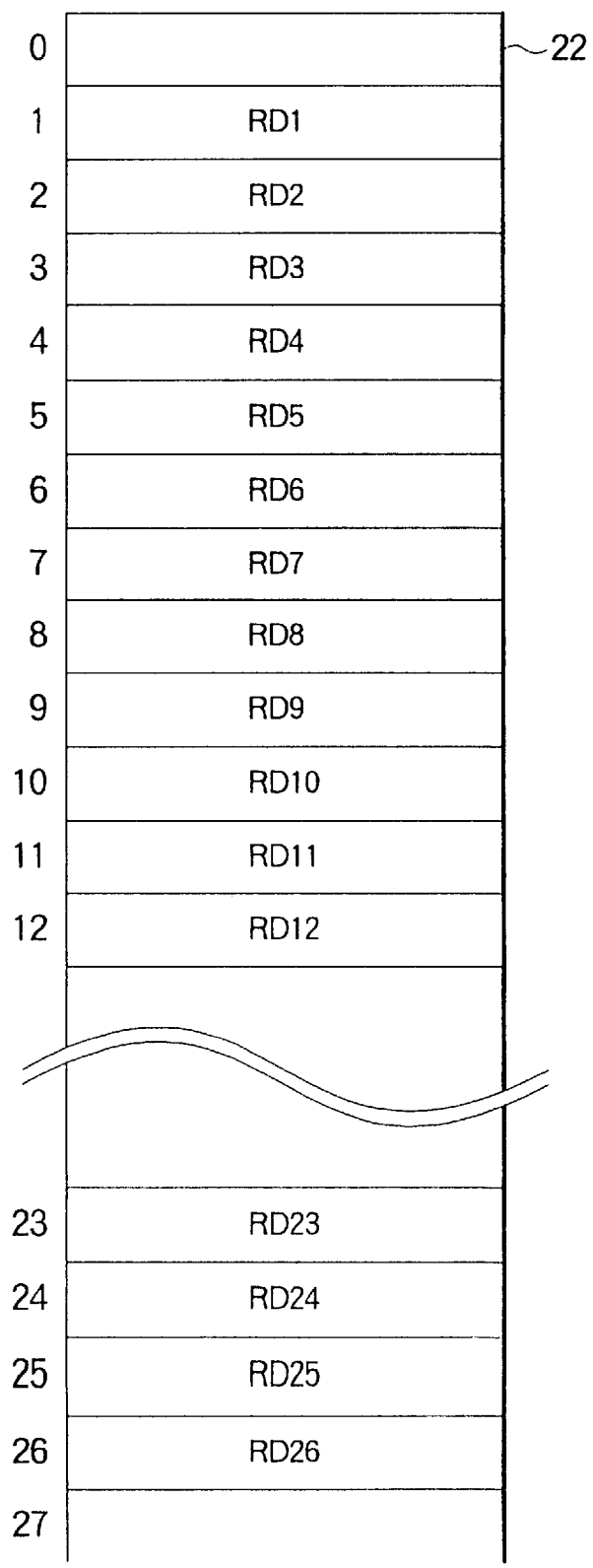
FIG. 4 illustrates data stored in a memory device.

Next, the operation of the direct memory access controller 15 will be illustrated for the transfer of the data shown in FIG. 4 from the memory 22 to the data processing unit 18. The data comprise twenty-six words, stored at addresses one to twenty-six in the memory 22. The dark lines in FIG. 4 indicate address boundaries that must not be crossed by any block in the transfer.

The data transfer will be described with reference to the flowcharts in FIGS. 5 and 6. The address signals will be assumed to be eight-bit signals (n=8).

Figure 5:
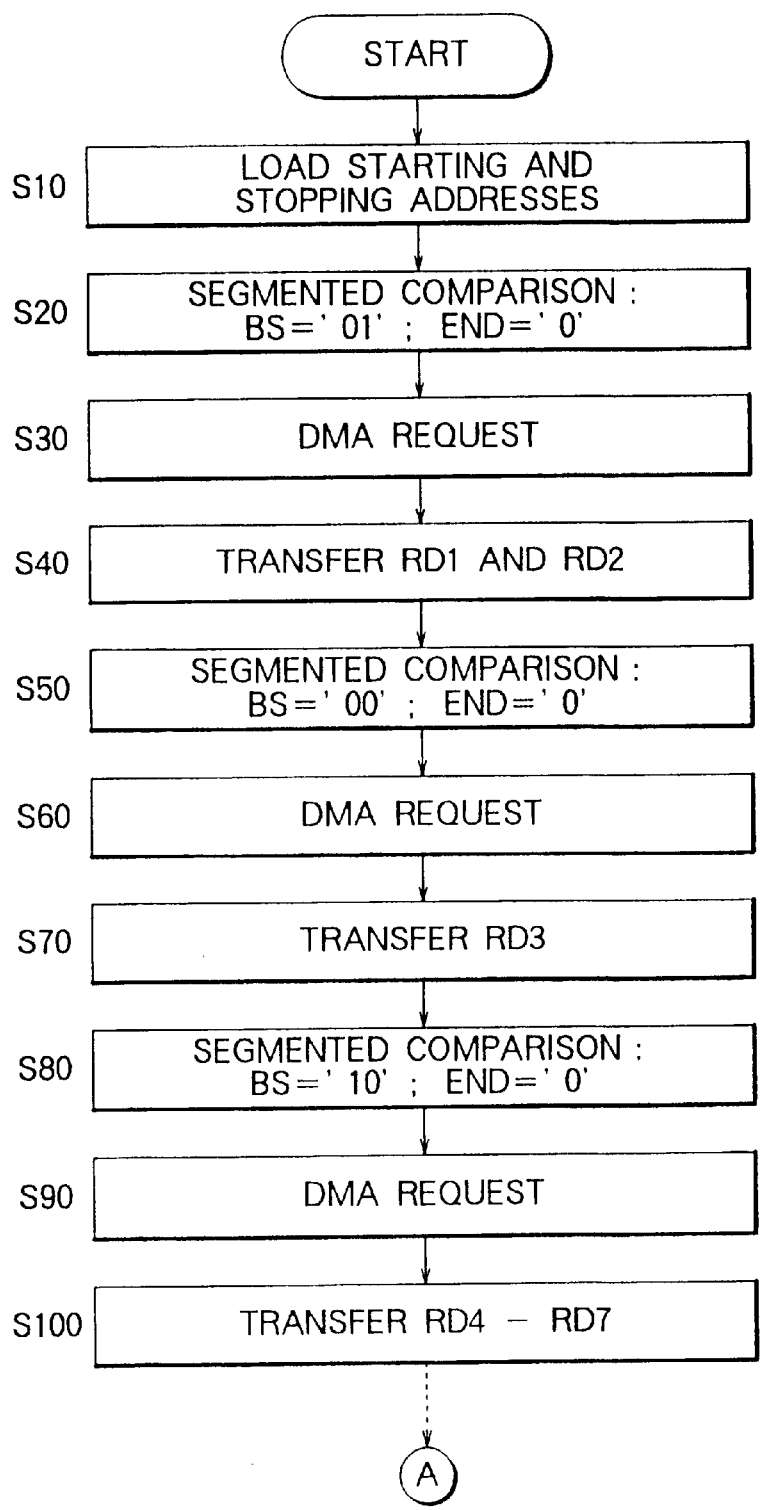
FIG. 5 is a flowchart indicating how the direct memory access controller in FIG. 1 transfers the first part of the data in FIG. 4.

Referring to FIG. 5, in step S10, the high-order controller 16 sets the starting and stopping addresses of the data transfer in the direct memory access controller 15. For example, the high-order controller 16 sends binary '00000001' as an address signal, accompanied by a starting-address-load pulse, thereby loading the value 'one' into the address counter 2, then sends binary '00011010' as an address signal, accompanied by a stopping-address-load pulse, thereby loading the value 'twenty-six' into the address register 4. The high-order controller 16 also sends a control signal indicating the direction of the transfer, which is relayed through the memory controller 20 to the direct memory access controller 15, and sends a standby signal to the data processing unit 18, thereby preparing the data processing unit 18 to receive and process data.

In step S20, the segmented comparator 10 performs a segmented comparison on the values in the address counter 2 and address register 4, obtaining the result shown in row nineteen of the table in FIG. 3. Specifically, the first comparator 12 finds that the six most significant bits ('000000') of the data address output by the address counter 2 are not equal to the six most significant bits ('000110') of the stopping address, and sets the equality signal (EQ) to '0.' The second comparator 14 then subtracts the two least significant bits ('01') of the data address from '11,' obtains a result of '10' ('two' in binary notation), sets the block size signal to '01' to indicate a block size of two words, and sets the end signal to '0.'

In step S30, DMA control logic 6 sends a DMA request signal (REQ) to the memory controller 20. When ready, the memory controller 20 activates the DMA acknowledge signal (ACK) in reply, and begins the first block transfer.

In step S40, the memory controller 20 successively transfers two words, as indicated by the block size signal, from the memory addresses indicated by the data address signal. Immediately after the transfer of each word, DMA control logic 6 sends the address counter 2 a count-up signal, incrementing the address value from one ('00000001') to two ('00000010'), then to three ('00000011'). Throughout the transfer, the DMA control logic 6 sets the two read/write signals (RD/WR and R/W) to the read state. The words RD1 and RD2 are read from the memory 22 through the memory controller 20 into the data register 8, and from the data register 8 into the data processing unit 18.

At the conclusion of this two-word block transfer, the memory controller 20 de-activates the acknowledge signal (ACK), and DMA control logic 6 de-activates the count-up signal.

In step S50, the segmented comparator 10 performs another segmented comparison, now comparing '00000011' with '00011010,' and obtains the result shown in row twenty of the table in FIG. 3. The block size signal is accordingly set to '00' to select a one-word block, while the end signal remains '0.'

In step S60, DMA control logic 6 issues another DMA request. When the memory controller 20 acknowledges the request, a one-word block is transferred, in step S70, in the manner described above. That is, RD3 is read from the memory 22 into the data processing unit 18, through the memory controller 20 and data register 8, and the address in the address counter 2 is incremented to from three to four ('00000100').

In step S80, the segmented comparator 10 compares the new data address value of four ('00000100') with the stopping value of twenty-six ('00011010'), and obtains the result shown in row seventeen of the table in FIG. 3. The block size signal is accordingly set to '10' to select a four-word block. The end signal remains '0.'

In step S90, DMA control logic 6 sends yet another DMA request. When this request is acknowledged, a four-word block comprising the words from RD4 to RD7 is transferred, in step S100. The address value in the address counter 2 is incremented four times during this transfer, from four ('00000100') to eight ('00001000').

The transfer continues in like manner through four more four-word blocks, transferring words RD8 to RD11, then words RD12 to RD15, then words RD16 to RD19, then words RD20 to RD23. The data address at the end of these four block transfers is twenty-four ('00011000').

Figure 6:
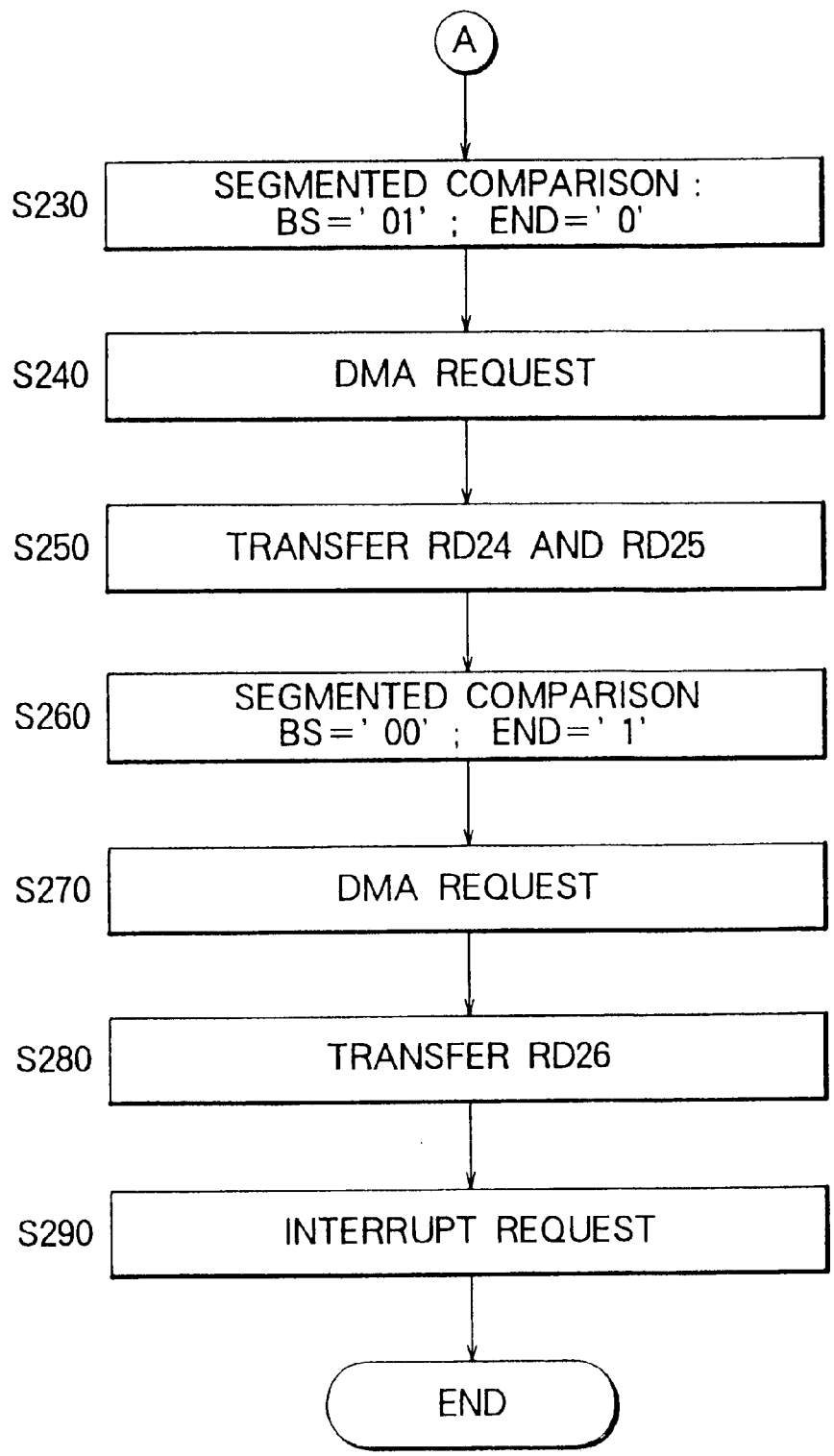
FIG. 6 is a flowchart indicating how the direct memory access controller in FIG. 1 transfers the last part of the data in FIG. 4.

Referring to step S230 in FIG. 6, in the segmented comparison preceding the next block transfer, '00011000' is compared with '00011010.' The six most significant bits of these address values are identical, so the first comparator 12 sets the equality signal to one ('1'). By subtracting the two least significant data address bits ('00') from the two least significant stopping address bits ('10'), the second comparator 14 obtains the result shown in row three of the table in FIG. 3. The block size signal is set to select a two-word block ('01'), while the end signal remains '0.'

In steps S240 and S250, DMA control logic 6 sends a DMA request signal, the memory controller 20 acknowledges this signal, and a two-word block comprising words RD24 and RD25 is transferred. The address in the address counter 2 is incremented from twenty-four ('00011000') to twenty-six ('100011010').

In step S260, the two compared addresses are identically twenty-six ('00011010'), and the segmented comparator 10 obtains the result shown in row eleven of the table in FIG. 3. The block size signal is set to '00' to select a one-word block, and the end signal is set to '1' to indicate that this block is the last block in the data transfer.

In steps S270 and S280, another DMA request is issued, and a one-word block comprising RD26 is transferred to the data processing unit 18 from address twenty-six in the memory 22.

In step S290, DMA control logic 6 sends the high-order controller 16 an interrupt request (INT) reporting the end of the data transfer.

As this example shows, since the direct memory access controller makes all block-size decisions autonomously, the high-order controller does not have to be interrupted until the entire data transfer is completed. Moreover, the direct memory access controller always selects the largest permitted block size that does not cross a forbidden boundary in the memory address space. The data transfer accordingly proceeds with maximum speed and minimum overhead, and no restrictions are placed on the starting and stopping addresses of the transfer.

The same benefits are of course obtained in data transfers in the write direction, from the data processing unit 18 to the memory 22.

The invention is not restricted to block sizes of one, two, and four words; obvious modifications can be made to accommodate other block sizes. If eight-word blocks are also permitted, for example, it suffices to have the first comparator 12 compare the n−3 most significant address bits, and the second comparator 14 compare the three least significant address bits.

The block sizes do not have to be powers of two. The rule shown in FIG. 3 can easily be modified to accommodate three-word blocks as well, for example.

Various other changes can be made to the rule shown in FIG. 3 without loss of data transfer speed. For example, the BS values in rows three and eighteen can be changed to '00,' to transfer a one-word block before a two-word block when there are three words to be transferred.

The segmented comparison does not have to be carried out by means of subtraction operations as described above. Various short-cuts are possible. For example, when the equality signal indicates non-equality of the high-order bits, the maximum block size is always selected if the low-order bits of the address output signal are all zero.

The address counter 2 was described as an up-counter, but a down-counter can be employed instead. In that case, the first comparator 12 and second comparator 14 can be modified to subtract stopping address bits from data address bits, instead of vice versa. The address counter 2 may also be an up/down-counter, permitting memory to be accessed in either ascending or descending address order, the mode of operation of the address counter 2 and segmented comparator 10 being switched accordingly.

The data register 8 can be eliminated if it is not necessary to buffer data during the transfer.

The data addresses and stopping addresses compared by the segmented comparator should be physical memory addresses, or should at least correspond to physical memory addresses in such a way that the least significant bits used in the second comparison are the same as the physical least significant bits.

The term 'direct memory access controller' has been used above, but the invention can be practiced in any type of data transfer controller that directly accesses a memory address space.

Those skilled in the art will recognize that further variations are possible within the scope claimed below.

What is claimed is:

1. A method of transferring data in blocks having a restricted set of permitted block sizes, without crossing certain address boundaries, comprising the steps of:

(a) storing a data address indicating a memory location at which a data transfer is to begin, and and a stopping address indicating a memory location at which the data transfer is to end;

(b) comparing a first part of said data address with a first part of said stopping address, thereby obtaining a first comparison result;

(c) comparing a second part of said data address with a second part of said stopping address, according to said first comparison result, thereby obtaining a second comparison result, said second comparison result selecting a block size in the set of permitted block sizes;

(d) transferring data in a block of the block size selected by said second comparison result, starting at said data address, and incrementing said data address as the data are transferred; and (e) repeating said steps (b), (c), and (d) until the data transfer reaches said stopping address.

2. The method of claim 1, wherein said selected block size is a maximum block size, among said permitted block sizes, that can be transferred without crossing any of said certain address boundaries.

3. The method claim 1, wherein said data address and said stopping address are physical memory addresses.

4. The method of claim 1, wherein:

said data address and said stopping address are n-bit addresses, n being a positive integer; and said second part of said data address and said second part of said stopping address comprise m least significant bits of said data address and said stopping address, respectively, m being a positive integer less than n.

5. The method of claim 4, wherein said first part of said data address and said first part of said stopping address comprise n−m most significant bits of said data address and said stopping address, respectively.

6. The method of claim 5, wherein said first comparison result has a first value when the n−m most significant bits of said data address are identical to the n−m most significant bits of said stopping address, and has a second value when the n−m most significant bits of said data address are not identical to the n−m most significant bits of said stopping address.

7. The method of claim 6 wherein, when said first comparison result has said first value, the block size in said step (c) is selected according to a difference between said data address and said stopping address.

8. The method of claim 6 wherein, when said first comparison result has said second value, the block size in said step (c) is selected according to the m least significant bits of said data address, the m least significant bits of said stopping address being ignored.

9. The method of claim 6 wherein, when said first comparison result has said second value and the m least significant bits of said data address all have values of zero, the block size selected in said step (c) is a largest block size in said set of permitted block sizes.

10. A data transfer controller for transferring data in blocks without crossing certain address boundaries, said blocks including data units of a predetermined size stored at respective data addresses comprising:

an address counter for storing a data address of a next data unit to be transferred;

an address register for storing a stopping address;

a segmented comparator, coupled to said address counter and said address register, for performing a segmented comparison on said data address and said stopping address before each block of data is transferred, thereby generating block size signals selecting block sizes of $2^N$ data units, where N is a non-negative integer selected by said segmented comparator; and a control unit coupled to said address counter and said segmented comparator, for repeatedly generating signals causing said data to be transferred in blocks with the block sizes selected by said block size signals one block at a time, until all the data from said data address to said stopping address have been transferred, and causing the data address in said address counter to be modified as said data are transferred.

11. The data transfer controller of claim 10, wherein said segmented comparator also generates an end signal indicating transfer of a last block of said data.

12. The data transfer controller of claim 10, further comprising a data register for buffering said data while said data are being transferred.

13. The data transfer controller of claim 10, wherein said segmented comparator selects a maximum block size that can be transferred without crossing said certain address boundaries.

14. The data transfer controller of claim 10, wherein said data address and said stopping address are physical memory addresses.

15. A data transfer controller for transferring data in blocks having a restricted set of permitted block sizes, without crossing certain address boundaries, comprising:

an address counter for storing a data address;

an address register for storing a stopping address;

a segmented comparator, coupled to said address counter and said address register, for performing a segmented comparison on said data address and said stopping address, thereby generating a block size signal selecting one of said permitted block sizes; and a control unit coupled to said address counter, for generating signals causing said data to be transferred in blocks with sizes selected by said block size signal, and causing the data address in said address counter to be modified as said data are transferred wherein said segmented comparator comprises:

a first comparator for comparing a first part of said data address, thereby obtaining a first comparison result; and a second comparator for comparing a second part of said data address with a second part of said stopping address according to said first comparator result, thereby obtaining a second comparison result, said second comparison result selecting said block size.

16. The data transfer controller of claim 15, wherein:

said data address and said stopping address are n-bit addresses, n being a positive integer; and said second part of said data address and said second part of said stopping address comprise m least significant bits of said data address and said stopping address, respectively, m being a positive integer less than n.

17. The data transfer controller of claim 16, wherein said first part of said data address and said first part of said stopping address comprise n−m most significant bits of said data address and said stopping address, respectively.

18. The data transfer controller of claim 17, wherein said first comparison result has a first value when the n−m most significant bits of said data address are identical to the n−m most significant bits of said stopping address, and has a second value when the n−m most significant bits of said data address are not identical to the n−m most significant bits of said stopping address.

19. The data transfer controller of claim 18 wherein, when said first comparison result has said first value, said second comparator selects said block size according to a difference between said data address and said stopping address.

20. The data transfer controller of claim 18 wherein, when said first comparison result has said second value, said second comparator selects said block size according to the m least significant bits of said data address, ignoring the m least significant bits of said stopping address.

21. The data transfer controller of claim 18 wherein, when said first comparison result has said second value and the m least significant bits of said data address all have values of zero, said second comparator selects a largest block size in said set of permitted block sizes.

* * * * *